United States Patent
Nakamura et al.

(10) Patent No.: US 9,742,029 B2
(45) Date of Patent: Aug. 22, 2017

(54) SECONDARY BATTERY INCLUDING A GEL ELECTROLYTE, BATTERY PACK, ELECTRIC VEHICLE, ELECTRIC POWER STORAGE SYSTEM, ELECTRIC POWER TOOL, AND ELECTRONIC APPARATUS INCLUDING THE SAME

(71) Applicant: Sony Corporation, Tokyo (JP)

(72) Inventors: Aiko Nakamura, Kanagawa (JP); Tadahiko Kubota, Kanagawa (JP); Kazumasa Takeshi, Kanagawa (JP); Shuhei Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 14/506,892

(22) Filed: Oct. 6, 2014

(65) Prior Publication Data

US 2015/0104691 A1    Apr. 16, 2015

(30) Foreign Application Priority Data

Oct. 11, 2013 (JP) .................................. 2013-213447

(51) Int. Cl.
*H01M 10/05* (2010.01)
*H01M 10/0565* (2010.01)
(Continued)

(52) U.S. Cl.
CPC ... *H01M 10/0565* (2013.01); *H01M 10/0525* (2013.01); *H01M 10/0568* (2013.01);
(Continued)

(58) Field of Classification Search
None
See application file for complete search history.

(56) References Cited

U.S. PATENT DOCUMENTS

| 5,296,318 A | 3/1994 | Gozdz et al. |
| 5,626,979 A * | 5/1997 | Mitsui ................. H01M 2/105 362/9 |

(Continued)

FOREIGN PATENT DOCUMENTS

| JP | 2000-123873 | 4/2000 |
| JP | 2003-077539 | 3/2003 |
| JP | 2006-286496 | 10/2006 |

OTHER PUBLICATIONS

"Molten Salts and Ionic Liquids", Gaune-Escard et al., 2010, p. 28.*

*Primary Examiner* — Ula C Ruddock
*Assistant Examiner* — Tony Chuo
(74) *Attorney, Agent, or Firm* — K&L Gates LLP

(57) ABSTRACT

A secondary battery includes a cathode, an anode, and an electrolyte layer including non-aqueous electrolytic solution and a polymer compound. The polymer compound includes a graft copolymer. The graft copolymer includes a block copolymer as a main chain, and includes one or both of a homopolymer and a copolymer as one or more side chains. The block copolymer includes, as polymerization units, vinylidene fluoride and hexafluoropropylene. The homopolymer includes, as a polymerization unit, one selected from the group consisting of vinylidene fluoride, hexafluoropropylene, monomethyl maleate, trifluoroethylene, chlorotrifluoroethylene, acrylic acid, and methacrylic acid. The copolymer includes, as polymerization units, two or more selected from the group consisting of vinylidene fluoride, hexafluoropropylene, monomethyl maleate, trifluoroethylene, chlorotrifluoroethylene, acrylic acid, and methacrylic acid.

11 Claims, 5 Drawing Sheets

(51) Int. Cl.
*H01M 10/0525* (2010.01)
*H01M 10/0568* (2010.01)

(52) U.S. Cl.
CPC .... *H01M 2220/10* (2013.01); *H01M 2220/20* (2013.01); *H01M 2220/30* (2013.01); *H01M 2300/0025* (2013.01); *H01M 2300/0091* (2013.01); *Y02E 60/122* (2013.01); *Y02T 10/7011* (2013.01)

(56) References Cited

U.S. PATENT DOCUMENTS

| | | | | |
|---|---|---|---|---|
| 6,037,080 | A * | 3/2000 | Kronfli | C08F 259/08 429/188 |
| 6,051,343 | A * | 4/2000 | Suzuki | H01M 10/08 429/303 |
| 6,210,835 | B1 * | 4/2001 | Arai | H01M 6/164 429/199 |
| 6,506,523 | B1 * | 1/2003 | Hatazawa | H01M 10/0565 429/316 |
| 2010/0216031 | A1 * | 8/2010 | Machida | H01M 10/0525 429/320 |
| 2013/0337298 | A1 * | 12/2013 | Iwamura | H01M 10/486 429/61 |

* cited by examiner

SECONDARY BATTERY INCLUDING A GEL ELECTROLYTE, BATTERY PACK, ELECTRIC VEHICLE, ELECTRIC POWER STORAGE SYSTEM, ELECTRIC POWER TOOL, AND ELECTRONIC APPARATUS INCLUDING THE SAME

CROSS REFERENCES TO RELATED APPLICATIONS

The present application claims priority to Japanese Priority Patent Application JP 2013-213447 filed in the Japan Patent Office on Oct. 11, 2013, the entire content of which is hereby incorporated by reference.

BACKGROUND

The present application relates to a secondary battery provided with an electrolyte layer that includes electrolytic solution and a polymer compound. The present application also relates to a battery pack, an electric vehicle, an electric power storage system, an electric power tool, and an electronic apparatus that use the secondary battery.

In recent years, various electronic apparatuses such as a mobile phone and a mobile information terminal device (PDA) have been widely used, and it has been demanded to further reduce the size and the weight of the electronic apparatuses and to achieve their longer life. Accordingly, as an electric power source for the electronic apparatuses, a battery, in particular, a small and light-weight secondary battery capable of providing high energy density has been developed.

In these days, it has been considered to apply a secondary battery to various other applications in addition to the foregoing electronic apparatuses. Examples of such other applications may include a battery pack attachably and detachably mounted on the electronic apparatuses or the like, an electric vehicle such as an electric automobile, an electric power storage system such as a home electric power server, and an electric power tool such as an electric drill.

The secondary battery includes a cathode, an anode, and electrolytic solution. The electrolytic solution is generally mounted, on the secondary battery, being used to impregnate a separator therewith. Other than this, the electrolytic solution may be mounted, on the secondary battery, being held by a polymer compound, in some cases. The secondary battery in this case includes an electrolyte layer that is a so-called gel electrolyte. In the secondary battery provided with such an electrolyte layer, leakage of the electrolytic solution is prevented.

A configuration of the polymer compound included in the electrolyte layer may largely influence battery characteristics of the secondary battery, which has led to various considerations on the configuration of the polymer compound.

Specifically, in order to improve mobility of lithium ions, a random copolymer that includes, as polymerization units, vinylidene fluoride and hexafluoropropylene, or the like is used (for example, see U.S. Pat. No. 5,296,318). In order to improve energy density without degrading discharge load characteristics, a block copolymer that includes, as polymerization units, vinylidene fluoride and hexafluoropropylene, and the like are used (for example, see Japanese Unexamined Patent Application Publication No. 2000-123873). In order to prevent precipitous heat generation upon occurrence of internal short-circuit or the like, monomethyl maleate, or the like as a denaturation substance is added to a random copolymer that includes, as polymerization units, vinylidene fluoride and hexafluoropropylene, or the like. (for example, see Japanese Unexamined Patent Application Publication No. 2006-286496). In order to improve ion conductivity without decreasing mechanical strength, acrylic acid or the like is graft-copolymerized with a copolymer that includes, as polymerization units, vinylidene fluoride and hexafluoropropylene (for example, see Japanese Unexamined Patent Application Publication No. 2003-077539).

SUMMARY

Various considerations have been given on an influence, of a polymer compound in an electrolyte layer, on battery characteristics of a secondary battery; however, sufficient battery characteristics have not been achieved yet, which leaves a room for improvement thereof.

It is desirable to provide a secondary battery, a battery pack, an electric vehicle, an electric power storage system, an electric power tool, and an electronic apparatus that are capable of achieving superior battery characteristics.

According to an embodiment of the present application, there is provided a secondary battery including a cathode, an anode, and an electrolyte layer including non-aqueous electrolytic solution and a polymer compound, and the polymer compound includes a graft copolymer. The graft copolymer includes a block copolymer as a main chain, and includes one or both of a homopolymer and a copolymer as one or more side chains. The block copolymer includes, as polymerization units, vinylidene fluoride and hexafluoropropylene. The homopolymer includes, as a polymerization unit, one selected from the group consisting of vinylidene fluoride, hexafluoropropylene, monomethyl maleate, trifluoroethylene, chlorotrifluoroethylene, acrylic acid, and methacrylic acid. The copolymer includes, as polymerization units, two or more selected from the group consisting of vinylidene fluoride, hexafluoropropylene, monomethyl maleate, trifluoroethylene, chlorotrifluoroethylene, acrylic acid, and methacrylic acid.

According to an embodiment of the present application, there is provided a battery pack including a secondary battery, a control section configured to control operation of the secondary battery, and a switch section configured to switch the operation of the secondary battery according to an instruction of the control section. The secondary battery includes a cathode, an anode, and an electrolyte layer including non-aqueous electrolytic solution and a polymer compound. The polymer compound includes a graft copolymer. The graft copolymer includes a block copolymer as a main chain, and includes one or both of a homopolymer and a copolymer as one or more side chains. The block copolymer includes, as polymerization units, vinylidene fluoride and hexafluoropropylene. The homopolymer includes, as a polymerization unit, one selected from the group consisting of vinylidene fluoride, hexafluoropropylene, monomethyl maleate, trifluoroethylene, chlorotrifluoroethylene, acrylic acid, and methacrylic acid. The copolymer includes, as polymerization units, two or more selected from the group consisting of vinylidene fluoride, hexafluoropropylene, monomethyl maleate, trifluoroethylene, chlorotrifluoroethylene, acrylic acid, and methacrylic acid.

According to an embodiment of the present application, there is provided an electric vehicle including a secondary battery, a conversion section configured to convert electric power supplied from the secondary battery into drive power, a drive section configured to operate according to the drive power, and a control section configured to control operation of the secondary battery. The secondary battery includes a cathode, an anode, and an electrolyte layer including non-aqueous electrolytic solution and a polymer compound. The polymer compound includes a graft copolymer. The graft copolymer includes a block copolymer as a main chain, and includes one or both of a homopolymer and a copolymer as one or more side chains. The block copolymer includes, as polymerization units, vinylidene fluoride and hexafluoropropylene. The homopolymer includes, as a polymerization unit, one selected from the group consisting of vinylidene fluoride, hexafluoropropylene, monomethyl maleate, trifluoroethylene, chlorotrifluoroethylene, acrylic acid, and methacrylic acid. The copolymer includes, as polymerization units, two or more selected from the group consisting of vinylidene fluoride, hexafluoropropylene, monomethyl maleate, trifluoroethylene, chlorotrifluoroethylene, acrylic acid, and methacrylic acid.

According to an embodiment of the present application, there is provided an electric power storage system including a secondary battery, one or more electric devices configured to be supplied with electric power from the secondary battery, and a control section configured to control the supplying of the electric power from the secondary battery to the one or more electric devices. The secondary battery includes a cathode, an anode, and an electrolyte layer including non-aqueous electrolytic solution and a polymer compound. The polymer compound includes a graft copolymer. The graft copolymer includes a block copolymer as a main chain, and includes one or both of a homopolymer and a copolymer as one or more side chains. The block copolymer includes, as polymerization units, vinylidene fluoride and hexafluoropropylene. The homopolymer includes, as a polymerization unit, one selected from the group consisting of vinylidene fluoride, hexafluoropropylene, monomethyl maleate, trifluoroethylene, chlorotrifluoroethylene, acrylic acid, and methacrylic acid. The copolymer includes, as polymerization units, two or more selected from the group consisting of vinylidene fluoride, hexafluoropropylene, monomethyl maleate, trifluoroethylene, chlorotrifluoroethylene, acrylic acid, and methacrylic acid.

According to an embodiment of the present application, there is provided an electric power tool including a secondary battery, and a movable section configured to be supplied with electric power from the secondary battery. The secondary battery includes a cathode, an anode, and an electrolyte layer including non-aqueous electrolytic solution and a polymer compound. The polymer compound includes a graft copolymer. The graft copolymer includes a block copolymer as a main chain, and includes one or both of a homopolymer and a copolymer as one or more side chains. The block copolymer includes, as polymerization units, vinylidene fluoride and hexafluoropropylene. The homopolymer includes, as a polymerization unit, one selected from the group consisting of vinylidene fluoride, hexafluoropropylene, monomethyl maleate, trifluoroethylene, chlorotrifluoroethylene, acrylic acid, and methacrylic acid. The copolymer includes, as polymerization units, two or more selected from the group consisting of vinylidene fluoride, hexafluoropropylene, monomethyl maleate, trifluoroethylene, chlorotrifluoroethylene, acrylic acid, and methacrylic acid.

According to an embodiment of the present application, there is provided an electronic apparatus including a secondary battery as an electric power supply source. The secondary battery includes a cathode, an anode, and an electrolyte layer including non-aqueous electrolytic solution and a polymer compound. The polymer compound includes a graft copolymer. The graft copolymer includes a block copolymer as a main chain, and includes one or both of a homopolymer and a copolymer as one or more side chains. The block copolymer includes, as polymerization units, vinylidene fluoride and hexafluoropropylene. The homopolymer includes, as a polymerization unit, one selected from the group consisting of vinylidene fluoride, hexafluoropropylene, monomethyl maleate, trifluoroethylene, chlorotrifluoroethylene, acrylic acid, and methacrylic acid. The copolymer includes, as polymerization units, two or more selected from the group consisting of vinylidene fluoride, hexafluoropropylene, monomethyl maleate, trifluoroethylene, chlorotrifluoroethylene, acrylic acid, and methacrylic acid.

According to the secondary battery of the embodiment of the present application, the polymer compound in the electrolyte layer includes the above-described graft copolymer, and superior battery characteristics are therefore achieved. Similar effects are achieved also in the battery pack, the electric vehicle, the electric power storage system, the electric power tool, and the electronic apparatus of the embodiments of the present application.

It is to be noted that the effects of the present application are not limited to the effects described above, and may be any of effects described related to the present application.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment of the present application is described below in detail with reference to the drawings. The description is provided in the following order.

1. Secondary Battery
   1-1. Configuration of Secondary Battery
      1-1-1. Cathode
      1-1-2. Anode
      1-1-3. Separator
      1-1-4. Electrolyte Layer
   1-2. Operation of Secondary Battery
   1-3. Method of Manufacturing Secondary Battery
   1-4. Functions and Effects of Secondary Battery
2. Applications of Secondary Battery
   2-1. Battery Pack
   2-2. Electric Vehicle
   2-3. Electric Power Storage System
   2-4. Electric Power Tool

[1. Secondary Battery]

First, a secondary battery (hereinafter, simply referred to as "secondary battery" or "secondary battery of the present application") of an embodiment of the present application is described.

[1-1. Configuration of Secondary Battery]

Figure 1:
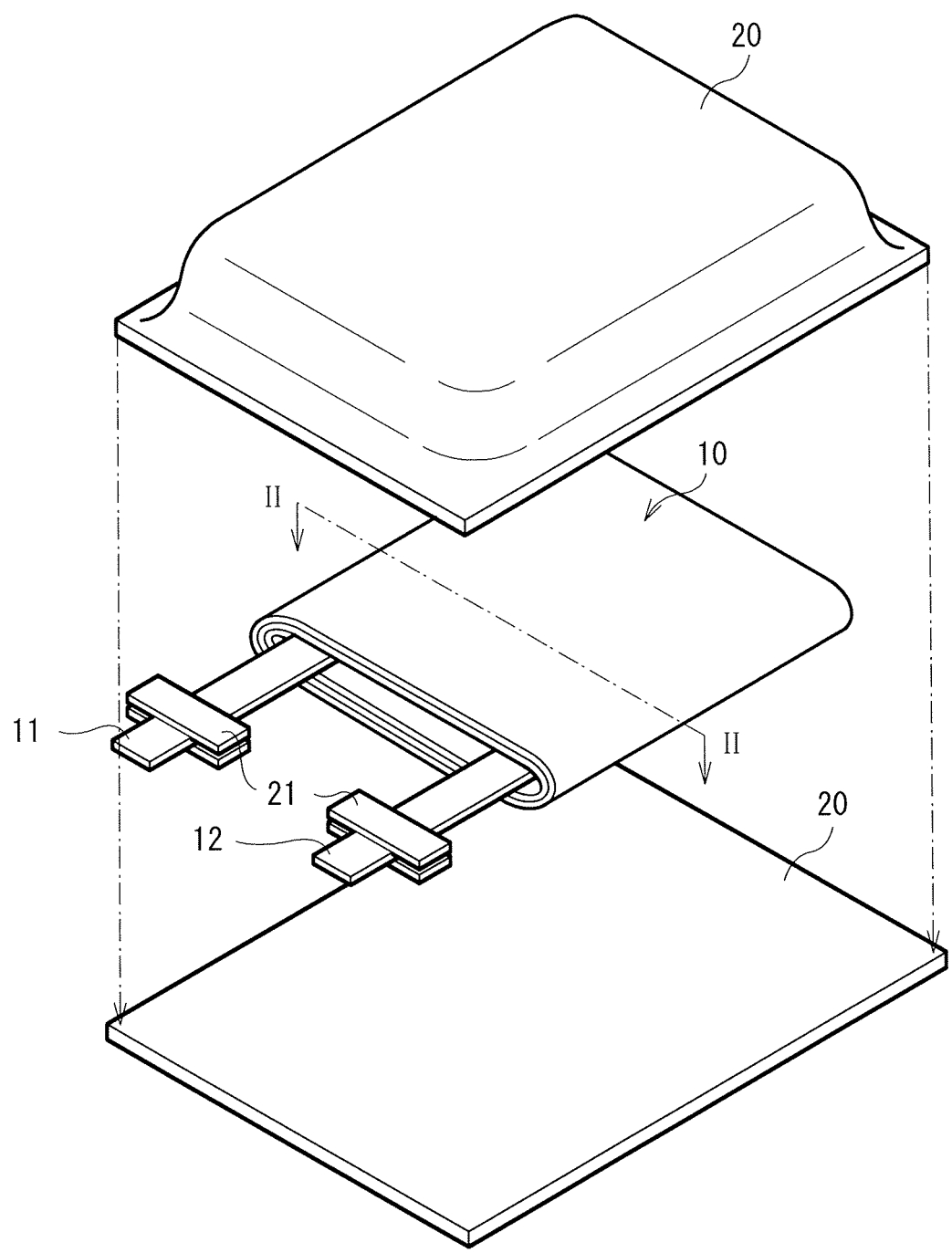
FIG. 1 is a perspective view illustrating a configuration of a secondary battery (of a laminated film type) according to an embodiment of the present application.
Figure 2:
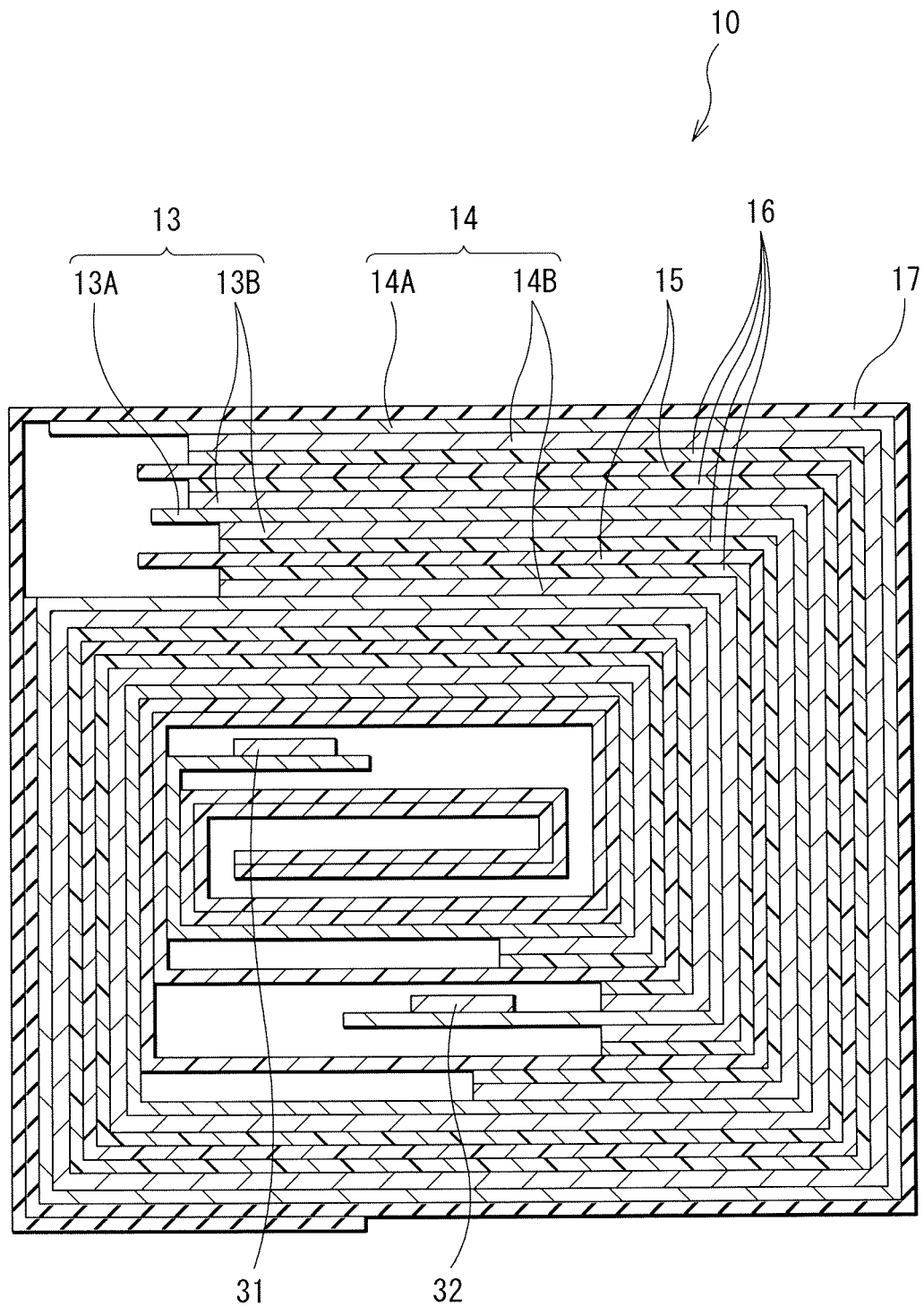
FIG. 2 is a cross-sectional view of a spirally wound electrode body taken along a line II-II illustrated in FIG. 1.

FIG. 1 illustrates a perspective configuration of a secondary battery. FIG. 2 illustrates a cross-sectional configuration of a spirally wound electrode body 10 taken along a line II-II illustrated in FIG. 1.

The secondary battery described herein obtains capacity of an anode 14 by insertion and extraction of an electrode reactant, and has a so-called laminated-film-type battery structure.

"Electrode reactant" is a substance related to an electrode reaction. To give an example, in a secondary battery (a lithium ion secondary battery) in which battery capacity is obtained by insertion and extraction of lithium (Li), the electrode reactant is lithium. Description is provided below referring to, as an example, a case where the secondary battery of the present embodiment of the present application is the lithium ion secondary battery.

In this secondary battery, for example, the spirally wound electrode body 10 may be contained inside a film-like package member 20. In the spirally wound electrode body 10, a cathode 13 and the anode 14 are layered with a separator 15 and an electrolyte layer 16 in between and are spirally wound. A cathode lead 11 is attached to the cathode 13, and an anode lead 12 is attached to the anode 14. The outermost periphery of the spirally wound electrode body 10 is protected by a protective tape 17.

The cathode lead 11 and the anode lead 12 may be, for example, led out from inside to outside of the package member 20 in the same direction. The cathode lead 11 may be made, for example, of one or more of electrically-conductive materials such as aluminum (Al). The anode lead 12 may be made, for example, of one or more of electrically-conducive materials such as copper (Cu), nickel (Ni), and stainless steel. These electrically-conductive materials may be in the shape, for example, of a thin plate or mesh.

The package member 20 may be a laminated film in which, for example, a fusion bonding layer, a metal layer, and a surface protective layer are laminated in this order. The package member 20 may be obtained by, for example, layering two laminated films so that the fusion bonding layers are opposed to the spirally wound electrode body 10, and subsequently fusion bonding outer edges of the respective fusion bonding layers. However, the two laminated films may be bonded to each other by an adhesive, or the like. Examples of the fusion bonding layer may include a film made of one or more of polyethylene, polypropylene, and the like. Examples of the metal layer may include an aluminum foil. Examples of the surface protective layer may include a film made of one or more of nylon, polyethylene terephthalate, and the like.

In particular, the package member 20 may be preferably an aluminum laminated film in which a polyethylene film, an aluminum foil, and a nylon film are laminated in this order. However, the package member 20 may be a laminated film having another laminated structure, a polymer film such as a polypropylene film, or a metal film.

For example, a close-attachment film 21 to prevent outside air intrusion may be inserted between the package member 20 and the cathode lead 11 and between the package member 20 and the anode lead 12. The close-attachment film 21 may be made of a material having close attachment characteristics with respect to the cathode lead 11 and the anode lead 12. Examples of the material having close-attachment characteristics may include polyolefin resin. More specific examples thereof may include one or more of polyethylene, polypropylene, modified polyethylene, and modified polypropylene.

[1-1-1. Cathode]

The cathode 13 may have, for example, a cathode active material layer 13B on both surfaces of a cathode current collector 13A. However, the cathode 13 may have the cathode active material layer 13B only on a single surface of the cathode current collector 13A.

The cathode current collector 13A may be made, for example, of one or more of electrically-conductive materials such as aluminum, nickel, and stainless steel.

The cathode active material layer 13B contains, as a cathode active material, one or more of cathode materials capable of inserting and extracting lithium. However, the cathode active material layer 13B may further contain one or more of other materials such as a cathode binder and a cathode electric conductor.

The cathode material may be preferably a lithium-containing compound, because high energy density is thereby obtained. Examples of the lithium-containing compound may include a lithium-transition-metal composite oxide and a lithium-transition-metal phosphate compound. The lithium-transition-metal composite oxide is an oxide containing lithium and one or more transition metal elements as constituent elements. The lithium-transition-metal phosphate compound is a phosphate compound containing lithium and one or more transition metal elements as constituent elements. The transition metal element may be preferably one or more of cobalt (Co), nickel, manganese (Mn), iron (Fe), and the like, because a higher voltage is obtained thereby. The chemical formula of the lithium-transition-metal composite oxide may be expressed by, for example, $Li_xM1O_2$, and the chemical formula of the lithium-transition-metal phosphate compound may be expressed by, for example, $Li_yM2PO_4$. In the formulas, M1 and M2 each represent one or more transition metal elements. Values of x and y vary according to the charge and discharge state, but may be typically in the range of $0.05 \leq x \leq 1.10$ and $0.05 \leq y \leq 1.10$.

Specific examples of the lithium-transition-metal composite oxide may include $LiCoO_2$, $LiNiO_2$, and a lithium-nickel-based composite oxide represented by the following Formula (1). Specific examples of the lithium-transition-metal phosphate compound may include $LiFePO_4$ and $LiFe_{1-u}Mn_uPO_4$ (u<1), because high battery capacity is thereby achieved and superior cycle characteristics are also achieved thereby.

$$LiNi_{1-z}M_zO_2 \qquad (1)$$

(M is one or more of cobalt, manganese, iron, aluminum, vanadium (V), tin (Sn), magnesium (Mg), titanium (Ti), strontium (Sr), calcium (Ca), zirconium (Zr), molybdenum (Mo), technetium (Tc), ruthenium (Ru), tantalum (Ta), tungsten (W), rhenium (Re), ytterbium (Yb), copper, zinc (Zn), barium (Ba), boron (B), chromium (Cr), silicon (Si), gallium (Ga), phosphorus (P), antimony (Sb), and niobium (Nb). z satisfies $0.005<z<0.5$.)

Other than the above-described materials, the cathode material may be, for example, one or more of an oxide, a disulfide, a chalcogenide, a conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the electrically-conductive polymer may include sulfur, polyaniline, and polythiophene. However, the cathode material may be a material other than the above-mentioned materials.

The cathode binder may include, for example, one or more of synthetic rubbers, polymer compounds, and the like. Examples of the synthetic rubber may include a styrene-butadiene-based rubber, a fluorine-based rubber, and ethylene propylene diene. Examples of the polymer compound may include polyvinylidene fluoride (PVDF), polyacrylic acid, and polyimide.

Examples of the cathode electric conductor may include one or more of carbon materials and the like. Examples of the carbon materials may include graphite, carbon black, acetylene black, and Ketjen black. However, the cathode electric conductor may be a metal material, an electrically-conductive polymer, or the like as long as the material has electric conductivity.

[1-1-2. Anode]

The anode 14 may have, for example, an anode active material layer 14B on both surfaces of an anode current collector 14A. However, the anode 14 may have, for example, the anode active material layer 14B only on a single surface of the anode current collector 14A.

The anode current collector 14A may be made, for example, of one or more of electrically-conductive materials such as copper, nickel, and stainless steel. The surface of the anode current collector 14A may be preferably roughened. Thereby, due to a so-called anchor effect, close-attachment characteristics of the anode active material layer 14B with respect to the anode current collector 14A are improved. In this case, it is enough that the surface of the anode current collector 14A in a region opposed to the anode active material layer 14B is roughened at least. Examples of roughening methods may include a method of forming fine particles by utilizing an electrolytic treatment. The electrolytic treatment is a method of forming the fine particles on the surface of the anode current collector 14A with the use of an electrolytic method in an electrolytic bath to provide concavities and convexities on the surface of the anode current collector 14A. A copper foil fabricated by an electrolytic method is generally called "electrolytic copper foil."

The anode active material layer 14B contains, as an anode active material, one or more of anode materials capable of inserting and extracting lithium. However, the anode active material layer 14B may further contain one or more of other materials such as an anode binder and an anode electric conductor. Details of the anode binder and the anode electric conductor may be, for example, similar to those of the cathode binder and the cathode electric conductor.

It is to be noted that chargeable capacity of the anode material may be preferably larger than discharge capacity of the cathode 13 in order to prevent lithium metal from being unintentionally precipitated on the anode 14 in the middle of charge. In other words, electrochemical equivalent of the anode material capable of inserting and extracting lithium may be preferably larger than electrochemical equivalent of the cathode 13.

Examples of the anode material may include one or more of carbon materials. One reason for this is because, in the carbon material, its crystal structure change at the time of insertion and extraction of lithium is extremely small, and high energy density and superior cycle characteristics are therefore achieved. Another reason is because the carbon material serves as an anode electric conductor as well. Examples of the carbon material may include graphitizable carbon, non-graphitizable carbon, and graphite. However, the spacing of (002) plane in the non-graphitizable carbon may be preferably equal to or larger than 0.37 nm, and the spacing of (002) plane in graphite may be preferably equal to or smaller than 0.34 nm. More specifically, examples of the carbon material may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at an appropriate temperature. Other than the above-mentioned materials, the carbon material may be low crystalline carbon heat-treated at a temperature of about 1000 deg C. or lower or may be amorphous carbon. It is to be noted that the shape of the carbon material may be any of a fibrous shape, a spherical shape, a granular shape, and a scale-like shape.

Further, examples of the anode material may include a material (a metal-based material) containing one or more of metal elements and metalloid elements as constitutional elements, because high energy density is achieved thereby. The metal-based material may be a simple substance, an alloy, or a compound, may be two or more thereof, or may have one or more phases thereof in part or all thereof. "Alloy" includes alloy containing one or more metal elements and one or more metalloid elements, in addition to alloy configured of two or more metal elements. Further, "alloy" may contain a nonmetallic element. Examples of the structure of the alloy may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming alloy with lithium. Specific examples thereof may include magnesium, boron, aluminum, gallium, indium (In), silicon, germanium (Ge), tin, lead (Pb), bismuth (Bi), cadmium (Cd), silver (Ag), zinc, hafnium (Hf), zirconium, yttrium (Y), palladium (Pd), and platinum (Pt). In particular, silicon, tin, or both may be preferable, because silicon and tin have a superior ability of inserting and extracting lithium, and therefore achieve high energy density.

A material containing silicon, tin, or both as constituent elements may be any of a simple substance, an alloy, and a compound of silicon, may be any of a simple substance, an alloy, and a compound of tin, may be two or more thereof, or may have one or more phases thereof in part or all thereof. It is to be noted that "simple substance" described herein merely refers to a simple substance in a general sense (a small amount of impurity may be therein contained), and does not necessarily refer to a purity 100% simple substance.

The alloys of silicon may contain, for example, one or more of elements such as tin, nickel, copper, iron, cobalt, manganese, zinc, indium, silver, titanium, germanium, bismuth, antimony, and chromium, as a constituent element other than silicon. The compounds of silicon may contain, for example, one or more of carbon (C), oxygen (O), and the like as constituent elements other than silicon. It is to be noted that the compounds of silicon may contain, for example, one or more of the series of elements described for the alloys of silicon, as constituent elements other than silicon.

Specific examples of the alloys of silicon and the compounds of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\le2$), and LiSiO. v in $SiO_v$ may be in a range of $0.2<v<1.4$.

The alloys of tin may contain, for example, one or more of elements such as silicon, nickel, copper, iron, cobalt, manganese, zinc, indium, silver, titanium, germanium, bismuth, antimony, and chromium, as constituent elements other than tin. The compounds of tin may contain, for example, one or more of elements such as carbon and oxygen as constituent elements other than tin. It is to be noted that the compounds of tin may contain, for example, one or more of the series of elements described for the alloys of tin, as constituent elements other than tin.

Specific examples of the alloys of tin and the compounds of tin may include $SnO_w$ ($0<w\le2$), $SnSiO_3$, LiSnO, and $Mg_2Sn$.

In particular, the material containing tin as a constituent element may be preferably, for example, a material containing a second constituent element and a third constituent element in addition to a first constituent element (tin) as constituent elements. Examples of the second constituent element may include one or more of elements such as cobalt, iron, magnesium, titanium, vanadium, chromium, manganese, nickel, copper, zinc, gallium, zirconium, niobium, molybdenum, silver, indium, cesium (Ce), hafnium, tantalum, tungsten, bismuth, and silicon. Examples of the third constituent element may include one or more of elements such as boron, carbon, aluminum, and phosphorus. One reason for this is because high battery capacity, superior cycle characteristics, and the like are achieved by containing the second and third constituent elements.

In particular, a material (SnCoC-containing material) containing tin, cobalt, and carbon as constituent elements may be preferable. In the SnCoC-containing material, for example, the content of carbon may be from about 9.9 mass % to about 29.7 mass % both inclusive, and the ratio of contents of tin and cobalt (Co/(Sn+Co)) may be from about 20 mass % to about 70 mass % both inclusive, because high energy density is achieved thereby.

The SnCoC-containing material may preferably have a phase containing tin, cobalt, and carbon. Such a phase may be preferably low-crystalline or amorphous. The phase is a reaction phase capable of reacting with lithium. Therefore, due to existence of the reaction phase, superior characteristics are achieved. A half bandwidth (a diffraction angle 2θ) of a diffraction peak obtained by X-ray diffraction of the reaction phase may be preferably equal to or larger than 1 deg in a case where CuKα ray is used as a specific X ray, and the insertion rate is 1 deg/min. One reason for this is because lithium is more smoothly inserted and extracted thereby, and reactivity with the electrolytic solution is decreased. It is to be noted that, in some cases, the SnCoC-containing material may include a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in a range of 2θ=from about 20 deg to about 50 deg both inclusive. Such a reaction phase may include, for example, the foregoing respective constituent elements, and it may be considered that the low crystalline or amorphous structure thereof may result mainly from the existence of carbon.

In the SnCoC-containing material, part or all of carbon as a constituent element may be preferably bonded to a metal element or a metalloid element as other constituent element, because cohesion or crystallization of tin and/or the like is suppressed thereby. The bonding state of elements is allowed to be checked, for example, by an X-ray photoelectron spectroscopy method (XPS). In a commercially-available device, for example, Al—Kα ray, Mg—Kα ray, or the like may be used as a soft X ray. In the case where part or all of carbons are bonded to a metal element, a metalloid element, or the like, the peak of a synthetic wave of is orbit of carbon (C1s) appears in a region lower than 284.5 eV. It is to be noted that, in the device, energy calibration is made so that the peak of 4 f orbit (Au4f) of gold atom (Au) is obtained in 84.0 eV. At this time, in general, because surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate both peaks from each other. In the waveform analysis, the position of the main peak existing on the lowest bound energy side is the energy standard (284.8 eV).

It is to be noted that the SnCoC-containing material is not limited to the material (SnCoC) configured of only tin, cobalt, and carbon as constituent elements. The SnCoC-containing material may further contain, for example, one or more of silicon, iron, nickel, chromium, indium, niobium, germanium, titanium, molybdenum, aluminum, phosphorus, gallium, bismuth, and the like as constituent elements, in addition to tin, cobalt, and carbon.

Other than the SnCoC-containing material, a material (SnCoFeC-containing material) containing tin, cobalt, iron, and carbon as constituent elements may be also preferable. The composition of the SnCoFeC-containing material may be any composition. To give an example, when the content of iron is set small, the content of carbon may be from about 9.9 mass % to about 29.7 mass % both inclusive, the content of iron may be from about 0.3 mass % to about 5.9 mass % both inclusive, and the ratio of contents of tin and cobalt (Co/(Sn+Co)) may be from about 30 mass % to about 70 mass % both inclusive. Further, when the content of iron is set larger, the content of carbon is from about 11.9 mass % to about 29.7 mass % both inclusive, the ratio of contents of tin, cobalt, and iron ((Co+Fe)/(Sn+Co+Fe)) is from about 26.4 mass % to about 48.5 mass % both inclusive, and the ratio of contents of cobalt and iron (Co/(Co+Fe)) is from about 9.9 mass % to about 79.5 mass % both inclusive. One reason for this is because, in such a composition range, high energy density is achieved. The physical characteristics (such as a half bandwidth) of the SnCoFeC-containing material are similar to those of the SnCoC-containing material described above.

Other than the above-mentioned materials, the anode material may be, for example, one or more of a metal oxide, a polymer compound, and the like. Examples of the metal oxide may include iron oxide, ruthenium oxide, and molybdenum oxide. Examples of the polymer compound may include polyacetylene, polyaniline, and polypyrrole.

The anode active material layer 14B may be formed, for example, by one or more of a coating method, a vapor-phase deposition method, a liquid-phase deposition method, a spraying method, and a firing method (a sintering method). The coating method may be a method in which, for example, after a particulate (powder) anode active material is mixed with an anode binder and/or the like, the mixture is dispersed in a solvent such as an organic solvent, and the anode current collector 14A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which the anode active material in a fused state or a semi-fused state is sprayed onto the anode current collector 14A. The firing method may be, for example, a method in which, after the anode current collector 14A is coated with the mixture diffused in the solvent by a coating method, heat treatment is performed at a temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 14 in the middle of charge, the electrochemical equivalent of the anode material capable of inserting and extracting lithium may be preferably larger than the electrochemical equivalent of the cathode. Further, in the case where an open circuit voltage (a battery voltage) at the time of completely-charged state is equal to or higher than 4.25 V, the extraction amount of lithium per unit mass is larger than that in the case where the open circuit voltage is 4.20 V even when the same cathode active material is used. Therefore, amounts of the cathode active material and the anode active material are adjusted taking into consideration that tendency in order to achieve high energy density.

[1-1-3. Separator]

The separator 15 separates the cathode 13 from the anode 14, and passes lithium ions therethrough while preventing current short circuit resulting from contact of both electrodes. The separator 15 may be, for example, a porous film including one or more of synthetic resin, ceramics, and the like. The separator 15 may be a laminated film in which two or more porous films are laminated. The synthetic resin may be, for example, polytetrafluoroethylene, polypropylene, polyethylene, or the like.

In particular, the separator 15 may include, for example, a polymer compound layer on one surface or both surfaces of the foregoing porous film (a base material layer). One reason for this is because close-attachment characteristics of the separator 15 with respect to the cathode 13 and the anode 14 are improved thereby, and therefore, skewness of the spirally wound electrode body 10 is suppressed. Therefore, a decomposition reaction of the electrolytic solution is suppressed, and liquid leakage of the electrolytic solution with which the base material layer is impregnated is suppressed. Accordingly, even when charge and discharge are repeatedly performed, the resistance is less likely to be increased, and battery swollenness is suppressed.

The polymer compound layer may contain, for example, one or more of polymer compounds such as PVDF, because such a polymer compound has superior physical strength and is electrochemically stable. However, when forming the polymer compound layer, for example, after solution in which the polymer material is dispersed or dissolved is prepared, the base material layer is coated with the solution. Alternatively, the base material layer may be soaked in the solution and may be subsequently dried.

[1-1-4. Electrolyte Layer]

The electrolyte layer 16 includes a polymer compound and electrolytic solution that is a liquid electrolyte. The electrolytic solution is held by the polymer compound. Specifically, the electrolyte layer 16 described herein is a so-called gel electrolyte, because high ion conductivity rate (for example, 1 mS/cm or higher at room temperature) is achieved and liquid leakage of the electrolytic solution is prevented thereby. It is to be noted that the electrolyte layer 16 may further include one or more of other materials such as an additive.

Hereinbelow, vinylidene fluoride is referred to as "VDF", hexafluoropropylene is referred to as "HFP", monomethyl maleate is referred to as "MMM", trifluoroethylene is referred to as "TFE", chlorotrifluoroethylene is referred to as "CTFE", acrylic acid is referred to as "AA", and methacrylic acid is referred to as "MA".

The polymer compound includes one or more of block-graft copolymer. "Block-graft copolymer" refers to a graft copolymer that includes a specific kind of block copolymer as a main chain and a specific kind of polymer as a side chain, which is described later.

A reason why the polymer compound includes the block-graft copolymer is because physical characteristics of the polymer compound are improved thereby compared to a case where the block-graft copolymer is not included.

In detail, first, because flexibility of the polymer compound is improved, mechanical strength of the polymer compound is less likely to be degraded. Secondly, because affinity of the polymer compound to the electrolytic solution is improved, it is made easier for the polymer compound to hold the electrolytic solution. Thirdly, synergetic action of the above-described flexibility and affinity suppresses degradation in mechanical strength of the polymer compound to the minimum, and makes it easier for the polymer compound to hold the electrolytic solution. Fourthly, because a crystalline portion and an amorphous portion are caused to coexist in the polymer compound, it is made more easier for the polymer compound to hold the electrolytic solution and the mechanical strength of the polymer compound is further improved. For these reasons, ion conductivity of the electrolyte layer 16 is improved, which suppresses degradation in discharge capacity resulting from degradation in physical characteristics of the polymer compound even when charge and discharge are repeatedly performed.

"Case where the block-graft copolymer is not included" described above may refer to the following cases, for example. A first example is a case where the polymer compound includes a random copolymer as a main chain. For example, the main chain may be a random copolymer composed of VDF and HFP. A second example is a case where the polymer compound includes other kind of block copolymer as a main chain. For example, the main chain may be a block copolymer composed of VDF and MMM. A third example is a case where the polymer compound includes a homopolymer as a main chain. For example, the main chain may be a homopolymer (PVDF) composed of VDF. A fourth example is a case where the polymer compound includes no side chain. A fifth example is a case where the polymer compound includes other kind of side chain.

A detailed configuration of the block-graft copolymer may be as follows. The block-graft copolymer includes a block copolymer as a main chain and includes one or both of a homopolymer and a copolymer as one or more side chains.

The block copolymer included in the main chain includes VDF and HFP as polymerization units. Specifically, the block copolymer is a polymer made by polymerization using at least VDF and HFP as polymerization units (monomers). In such a polymer, monomers of the same kind are arranged continuously.

A content (a copolymerization amount) of each of VDF and HFP in the block copolymer is not particularly limited. In particular, the copolymerization amount of VDF may be preferably larger than the copolymerization amount of HFP, because the polymer compound easily gels and it therefore becomes easier for the electrolytic solution to be held by the polymer compound. Further, the copolymerization amount of HFP may be preferably 7 wt %, and may be more preferably from about 7 wt % to about 20 wt %. This is because the copolymerization amount of HFP is made appropriate and the polymer compound therefore becomes easier to gel. It is to be noted that, in order to examine the copolymerization amounts, for example, the polymer compound may be analyzed by gel permeation chromatography (GPC). In this case, polystyrene may be used as a standard sample, for example.

It is to be noted that the block copolymer may further include one or more of other polymerization units. Examples of the other polymerization units may include one or more of MMM, TFE, CTFE, and the like.

A content (a copolymerization amount) of other polymerization units in the block copolymer is not particularly limited. In particular, the copolymerization amount of HFP may be preferably larger than the sum of contents of other polymerization units, because it becomes easier for the polymer compound to hold the electrolytic solution.

The homopolymer included in the side chain includes, as a polymerization unit, one of VDF, HFP, MMM, TFE, CTFE, AA, MA, and the like. In other words, the homopolymer is a polymer (homopolymer) made by polymerization using one of VDF, HFP, MMM, TFE, CTFE, AA, MA, and the like as a polymerization unit (monomer). Specific examples of such a homopolymer may include PVDF, polyhexafluoropropylene, poly(monomethyl maleate), monotetrafluoroethylene, and polychlorotrifluoroethylene.

The copolymer included in the side chain includes, as polymerization units, any two or more of VDF, HFP, MMM, TFE, CTE, AA, MA, and the like. In other words, the copolymer is a polymer (copolymer) made by polymerization using, as polymerization units (monomers), any two or more of VDF, HFP, MMM, TFE, CTFE, AA, MA, and the like. Specific examples of such a copolymer may include two-kind-based copolymer (VDF-HFP copolymer) in which VDF and HFP are used, a three-kind-based copolymer (VDF-HFP-MMM copolymer) in which VDF, HFP, and MMM are used, or the like. It is to be noted that, unlike the copolymer (the block copolymer) included in the main chain, the copolymer included in the side chain may be a random copolymer, a block copolymer, or both.

When the number of side chain is 1, the side chain is one of the homopolymers and copolymers described above.

When the number of side chain is 2 or more, the two or more side chains are any two or more of the homopolymers and copolymers described above. In this case, the two or more side chains may be the same kind or may be different kinds. Further, part of side chains in the two or more side chains may be the same kind.

In particular, the homopolymer may preferably include, as the polymerization unit, one of VDF, HFP, MMM, TFE, and CTFE, and may more preferably include VDF. The copolymer may preferably include, as the polymerization units, any two or more of VDF, HFP, MMM, TFE, and CTFE, and may more preferably include VDF. This is because the polymer compound gels further more easily thereby independently of a composition of the main chain (the block-graft copolymer). It is also because it becomes further easier for the polymer compound to hold the electrolytic solution and the mechanical strength of the polymer compound is further improved.

In the block-graft copolymer, a coupling relationship between the main chain and the side chains is limited as follows.

To be a graft copolymer, it is necessary that a kind of the side chain (polymer) is different from a kind of a part (polymer), in the main chain, to which the side chain is introduced (coupled). Accordingly, to a part in which VDF is polymerized in the main chain including a copolymer that includes VDF and HFP as polymerization units, it is necessary that a polymer of a kind different from that of the homopolymer (PVDF) of VDF is introduced. Similarly, to a part in which HFP is polymerized in the main chain, it is necessary to introduce, as a side chain, a polymer of a kind different from that of the homopolymer (polyhexafluoropropylene) of HFP.

The block-graft copolymer may include one or more substituent groups. Kinds of the one or more substituent groups may be appropriately selected depending on a function to be attached to the block-graft copolymer, for example.

To give an example, VDF included, in the block-graft copolymer, as the polymerization unit of the main chain and/or the polymerization unit of the side chain may include, as a substituent group, one or more of halogen groups and hydrogen-eliminated groups described below. "Hydrogen-eliminated group" may be, for example, one or more of groups in each which one hydrogen group is eliminated from each of HFP, MMM, TFE, CTFE, methyl acrylic acid, ethyl acrylic acid, styrene, butadiene, hexafluoroacetone, ethylene oxide, propylene oxide, acrylonitrile, and methacrylonitrile.

TFE included, in the block-graft copolymer, as the polymerization unit of the main chain and/or the polymerization unit of the side chain may include, as a substituent group, one or more of halogen groups and hydrogen-eliminated groups described above. This is because of a reason similar to that in the above-described case where VDF includes a substituent group. Examples of the halogen groups may include a fluorine group (—F), a chlorine group (—Cl), a bromine group (—B), and an iodine group (—I). CTFE may include a substituent group similar to those described above for TFE.

A molecular weight (a weight average molecular weight) of the block-graft copolymer is not particularly limited, but, for example, may be preferably, from about hundred thousand to about three million, because solubility, etc. are thereby secured.

It is to be noted that, as long as the polymer compound includes the above-described block-graft copolymer, the polymer compound may further include one or more of other polymers. Such other polymer may be a homopolymer, or may be a copolymer. Examples of such a homopolymer may include polyacrylonitrile, polyethylene oxide, polypropylene oxide, polyphosphazene, polysiloxane, polyvinyl fluoride, polyvinyl acetate, polyvinyl alcohol, polymethyl methacrylate, polyacrylic acid, methacrylic acid, styrenebutadiene rubber, nitrile-butadiene rubber, polystyrene, and polycarbonate. Examples of the copolymer may include a copolymer made by polymerization using VDF and HFP as polymerization units (monomers), because such a copolymer is electrochemically stable. However, the copolymer that is referred to as other polymer may be a random copolymer, or may be a block copolymer.

The electrolytic solution includes a solvent and an electrolyte salt. It is to be noted that the electrolytic solution may further include one or more of other materials such as an additive.

The solvent may include one or more of non-aqueous solvents such as organic solvents. The electrolytic solution including the non-aqueous solvent is a so-called non-aqueous electrolytic solution.

Examples of the non-aqueous solvents may include cyclic ester carbonate, chain ester carbonate, lactone, chain carboxylic ester, and nitrile, because superior battery capacity, superior cycle characteristics, superior conservation characteristics, and the like are thereby achieved. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, the non-aqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitro methane, nitroethane, sulfolane, trimethyl phosphate, dimethyl sulfoxide, or the like because a similar advantage is thereby achieved.

In particular, one or more of ethylene carbonate, propylene carbonate, dimethyl carbonate, diethyl carbonate, and ethyl methyl carbonate may be preferable, because further superior battery capacity, further superior cycle characteristics, further superior conservation characteristics, and the like are thereby obtained. In this case, a combination of a high viscosity (high dielectric constant) solvent (for example, specific dielectric constant ∈≥30) such as ethylene carbonate and propylene carbonate and a low viscosity solvent (for example, viscosity ≤1 mPa·s) such as dimethyl carbonate, ethylmethyl carbonate, and diethyl carbonate may be more preferable. One reason for this is because the dissociation property of the electrolyte salt and ion mobility are thereby improved.

In particular, the solvent may include one or more of unsaturated cyclic ester carbonate, halogenated ester carbonate, sultone (cyclic sulfonic ester), acid anhydride, and the like. One reason for this is because, in this case, chemical stability of the electrolytic solution is improved. The unsaturated cyclic ester carbonate is a cyclic ester carbonate including one or more unsaturated bonds (carbon-carbon double bonds or carbon-carbon triple bonds). Examples of the unsaturated cyclic ester carbonate may include vinylene carbonate, vinylethylene carbonate, and methyleneethylene carbonate. The halogenated ester carbonate is cyclic or chain ester carbonate having one or more halogens as constituent elements. Examples of the cyclic halogenated ester carbonate may include 4-fluoro-1,3-dioxolane-2-one and 4,5-difluoro-1,3-dioxolane-2-one. Examples of the chain halogenated ester carbonate may include fluoromethyl methyl carbonate, bis (fluoromethyl) carbonate, and difluoromethyl methyl carbonate. Examples of the sultone may include propane sultone and propene sultone. Examples of the acid anhydrides may include succinic anhydride, ethane disulfonic anhydride, and sulfobenzoic anhydride. However, the solvent may be other material.

The electrolyte salt may contain, for example, one or more of salts such as lithium salt. However, the electrolyte salt may contain, for example, salt other than the lithium salt. Examples of the salt other than the lithium salt may include salt of light metal salt other than lithium.

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr), because superior battery capacity, superior cycle characteristics, superior conservation characteristics, and the like are thereby achieved.

In particular, one or more of $LiPF_6$, $LiBF_4$, $LiClO_4$, and $LiAsF_6$ may be preferable, and $LiPF_6$ may be more preferable, because the internal resistance is thereby lowered, and a higher effect is thereby achieved. However, the electrolyte salt may be other salt.

Although the content of the electrolyte salt is not particularly limited, the content thereof may be preferably from about 0.3 mol/kg to about 3.0 mol/kg both inclusive with respect to the solvent, because high ion conductivity is thereby achieved.

[1-2. Operation of Secondary Battery]

The secondary battery may operate, for example, as follows. At the time of charge, lithium ions extracted from the cathode 13 may be inserted in the anode 14 via the electrolyte layer 16. At the time of discharge, lithium ions extracted from the anode 14 may be inserted in the cathode 13 via the electrolyte layer 16.

[1-3. Method of Manufacturing Secondary Battery]

The secondary battery including the electrolyte layer 16 may be manufactured, for example, by the following three kinds of procedures.

When the cathode 13 is fabricated, first, the cathode active material may be mixed with the cathode binder, the cathode electric conductor, and/or the like to prepare a cathode mixture. Subsequently, the cathode mixture is dispersed or dissolved in an organic solvent or the like to obtain paste cathode mixture slurry. Lastly, the cathode mixture slurry is applied onto both surfaces of the cathode current collector 13A, which is dried to form the cathode active material layer 13B. The cathode active material layer 13B may be compression-molded with the use of a roll pressing machine and/or the like. In this case, the compression-molding process may be performed while heating the cathode active material layer 13B, or the compression-molding process may be repeated several times.

When the anode 14 is fabricated, the anode active material layer 14B is formed on both surfaces of the anode current collector 14A by a fabrication procedure almost similar to that of the cathode 13 described above. Specifically, an anode active material may be mixed with the anode binder, the anode electric conductor, and/or the like to prepare an anode mixture, which is subsequently dispersed or dissolved in an organic solvent or the like to obtain paste anode mixture slurry. Subsequently, the anode mixture slurry is applied onto both surfaces of the anode current collector 14A, which is dried to form the anode active material layer 14B. Thereafter, the anode active material layer 14B may be compression-molded with the use of a roll pressing machine and/or the like as necessary.

Subsequently, the electrolytic solution, the polymer compound including the block-graft copolymer, and the solvent such as an organic solvent are mixed. The mixture is stirred to prepare sol precursor solution. The block-graft copolymer may be formed by one or more publicly-known polymerization reactions. Examples of the publicly-known polymerization reactions may include a radical polymerization reaction, an anion polymerization reaction, and an ion copolymerization reaction. Subsequently, the precursor solution is applied onto the cathode 13 and the anode 14. The applied precursor solution is dried to form the gel electrolyte layer 16. Thereafter, the cathode lead 11 is attached to the cathode current collector 13A by a welding method and/or the like, and the anode lead 12 is connected to the anode current collector 14A by a welding method and/or the like. Subsequently, the cathode 13 and the anode 14 are layered with the separator 15 and the electrolyte layer 16 in between and are spirally wound to fabricate the spirally wound electrode body 10. A protective tape 17 is adhered to an outermost periphery of the spirally wound electrode body 10. Subsequently, the spirally wound electrode body 10 is sandwiched between two pieces of film-like package members 20, the outer edges of the package members 20 are bonded by a thermal fusion bonding method and/or the like to enclose the spirally wound electrode body 10 into the package members 20. In this case, the close-attachment films 21 are inserted between the cathode lead 11 and the package member 20 and between the anode lead 12 and the package member 20.

In the second procedure, the cathode lead 11 is attached to the cathode 13, and the anode lead 12 is attached to the anode 14. Subsequently, the cathode 13 and the anode 14 are layered with the separator 15 in between and are spirally wound to fabricate a spirally wound body as a precursor of the spirally wound electrode body 10. Thereafter, the protective tape 17 is adhered to the outermost periphery thereof. Subsequently, after the spirally wound body is sandwiched between two pieces of the film-like package members 20, the outermost peripheries except for one side are bonded by a thermal fusion bonding method and/or the like, and the spirally wound body is contained in the pouch-like package member 20. Subsequently, the electrolytic solution, a monomer as a raw material for the polymer compound, a polymerization initiator, and other materials such as a polymerization inhibitor are mixed to prepare a composition for electrolyte. Subsequently, the composition for electrolyte is injected into the pouch-like package member 20. Thereafter, the package member 20 is hermetically sealed by a thermal fusion bonding method and/or the like. Subsequently, the monomers are thermally polymerized to form the polymer compound. Thereby, the polymer compound is impregnated with the electrolytic solution, the polymer compound gels, and accordingly, the electrolyte layer 16 is formed.

In the third procedure, the spirally wound body is fabricated and contained in the pouch-like package member 20 in a manner similar to that of the foregoing second procedure, except that the separator 15 with both surfaces coated with a polymer compound is used. Examples of the polymer compound applied onto the separator 15 may include a polymer (a homopolymer, a copolymer, or a multicomponent copolymer) containing VDF as a component. Specific examples of the homopolymer may include PVDF. Examples of the copolymer may include a binary copolymer containing VDF and HFP as components. Examples of the multicomponent copolymer may include a ternary copolymer containing VDF, HFP, and CTFE as components. It is to be noted that, together with the polymer containing VDF as a component, other one or more polymer compounds may be used. Subsequently, electrolytic solution is prepared and injected into the package member 20. Thereafter, the opening of the package member 20 is hermetically sealed by a thermal fusion bonding method and/or the like. Subsequently, the resultant is heated while a weight is applied to the package member 20, and the separator 15 is closely attached to the cathode 13 and the anode 14 with the polymer compound in between. Thereby, the polymer compound in the polymer compound layer is impregnated with the electrolytic solution, the polymer compound gels, and accordingly, the electrolyte layer 16 is formed.

In the third procedure, swollenness of the secondary battery is suppressed more than in the first procedure. Further, in the third procedure, the monomer as the raw material of the polymer compound, the solvent, and the like are less likely to be left in the electrolyte layer 16 compared to in the second procedure. Therefore, the formation step of the polymer compound is favorably controlled. This allows the separator 15, the electrolyte layer 16, and the cathode 13 and the anode 14 to be attached sufficiently closely.

[1-4. Functions and Effects of Secondary Battery]

According to the above-described secondary battery, the polymer compound in the electrolyte layer 16 includes the block-graft copolymer. In this case, flexibility of the polymer compound is improved and affinity of the polymer compound with the electrolytic solution is improved, as described above. Synergetic action thereof therefore suppresses degradation in mechanical strength of the polymer compound to the minimum and it is made easier for the polymer compound to hold the electrolytic solution. This improves ion conductivity of the electrolyte layer 16, which suppresses decrease in discharge capacity resulting from degradation in physical characteristics of the polymer compound even when charge and discharge are repeatedly performed. As a result, it is possible to achieve superior battery characteristics.

[2. Applications of Secondary Battery]

Next, description is given of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (an electric power source used preferentially), or may be an auxiliary electric power source (an electric power source used instead of a main electric power source or used being switched from the main electric power source). In the case where the secondary battery is used as the auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include a mobile lifestyle appliance such as an electric shaver; a storage device such as a backup electric power source and a memory card; an electric power tool such as an electric drill and an electric saw; a battery pack used as an attachable and detachable electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, etc. One reason for this is because, in these applications, since superior battery characteristics are demanded, performance is effectively improved with the use of the secondary battery according to the embodiment of the present application. It is to be noted that the battery pack is an electric power source using secondary batteries, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, electric power is stored in the secondary battery as an electric power storage source, and therefore, home electric products and the like become usable with the use of the stored electric power. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Description is specifically given of some application examples of the secondary battery. It is to be noted that the configurations of the respective application examples described below are mere examples, and may be changed as appropriate.

[2-1. Battery Pack]

Figure 3:
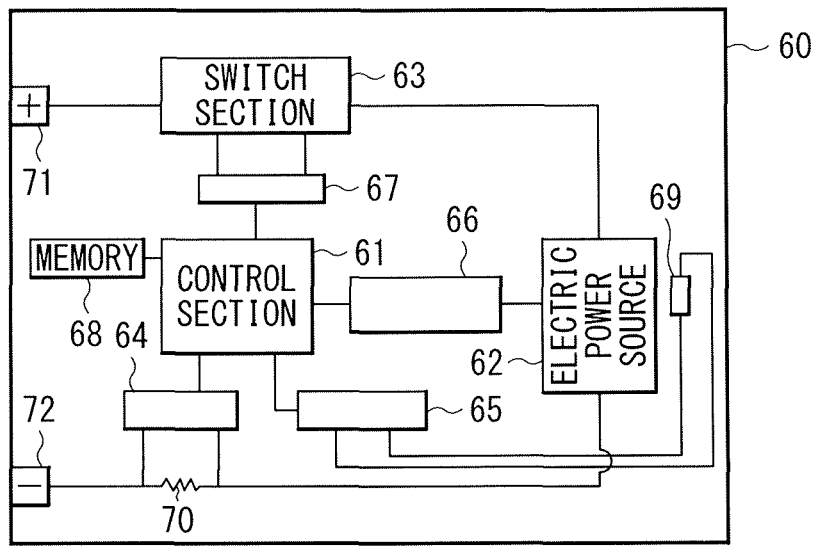
FIG. 3 is a block diagram illustrating a configuration of an application example (a battery pack) of the secondary battery.

FIG. 3 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60. The housing 60 may be made, for example, of a plastic material or the like.

The control section 61 controls operation of the whole battery pack (including a used state of the electric power source 62), and may include, for example, a central processing unit (CPU) and/or the like. The electric power source 62 includes one or more secondary batteries of an embodiment of the present application. The electric power source 62 may be, for example, an assembled battery including two or more secondary batteries. Connection type of the secondary batteries may be a series-connected type, may be a parallel-connected type, or may be a mixed type thereof. To give an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used, for example, for a case in which the control section 61 controls charge and discharge at the time of abnormal heat generation or a case in which the control section 61 performs a correction process at the time of calculating remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charge current is prevented from flowing in a current path of the electric power source 62 by disconnecting the switch section 63 (a charge control switch) in the case where, for example, the battery voltage reaches an overcharge detection voltage. Accordingly, in the electric power source 62, only discharge is allowed to be performed through the discharging diode. It is to be noted that, for example, in the case where a large current flows at the time of charge, the switch control section 67 blocks the charge current.

Further, the switch control section 67 executes causes a discharge current to be prevented from flowing in the current path of the electric power source 62 by disconnecting the switch section 63 (a discharge control switch) in the case where, for example, the battery voltage reaches an overdischarge detection voltage. Accordingly, in the electric power source 62, only charge is allowed to be performed through the charging diode. It is to be noted that, for example, in the case where a large current flows at the time of discharge, the switch control section 67 blocks the discharge current.

It is to be noted that, in the secondary battery, for example, the overcharge detection voltage may be about 4.20 V±0.05 V, and the overdischarge detection voltage may be about 2.4 V±0.1 V.

The memory 68 may be, for example, an EEPROM as a non-volatile memory, or the like. The memory 68 may store, for example, numerical values calculated by the control section 61 and information of the secondary battery measured in a manufacturing step (such as an internal resistance in the initial state). It is to be noted that, in the case where the memory 68 stores full charge capacity of the secondary battery, the control section 61 is allowed to comprehend information such as remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven with the use of the battery pack or an external device (such as a battery charger) used for charging the battery pack. The electric power source 62 is charged and discharged through the cathode terminal 71 and the anode terminal 72.

[2-2. Electric Vehicle]

Figure 4:
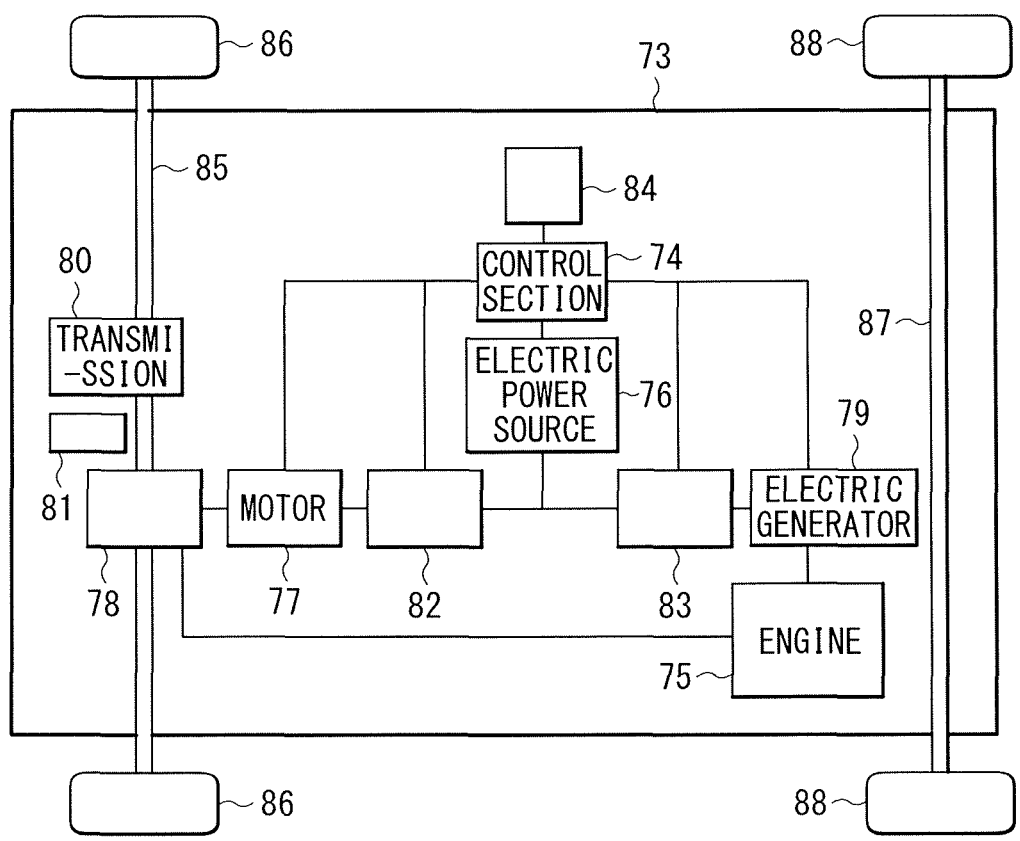
FIG. 4 is a block diagram illustrating a configuration of an application example (an electric vehicle) of the secondary battery.

FIG. 4 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use of, for example, one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. With the use of the torque, the electric generator 79 generates alternating-current electric power. The generated alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 is driven with the use of the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by utilizing the torque. It may be preferable that the alternating-current electric power is converted into direct-current electric power through the inverter 82, and the direct-current regenerative electric power is stored in the electric power source 76.

The control section 74 controls operations of the whole electric vehicle, and, for example, may include a CPU and/or the like. The electric power source 76 includes one or more secondary batteries of an embodiment of the present application. Alternatively, the electric power source 76 may be connected to an external electric power source, and electric power may be stored by receiving the electric power from the external electric power source. The various sensors 84 may be used, for example, for controlling the number of revolutions of the engine 75 or for controlling an opening level (a throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (an electric automobile) that operates with the use of only the electric power source 76 and the motor 77 without using the engine 75.

[2-3. Electric Power Storage System]

Figure 5:
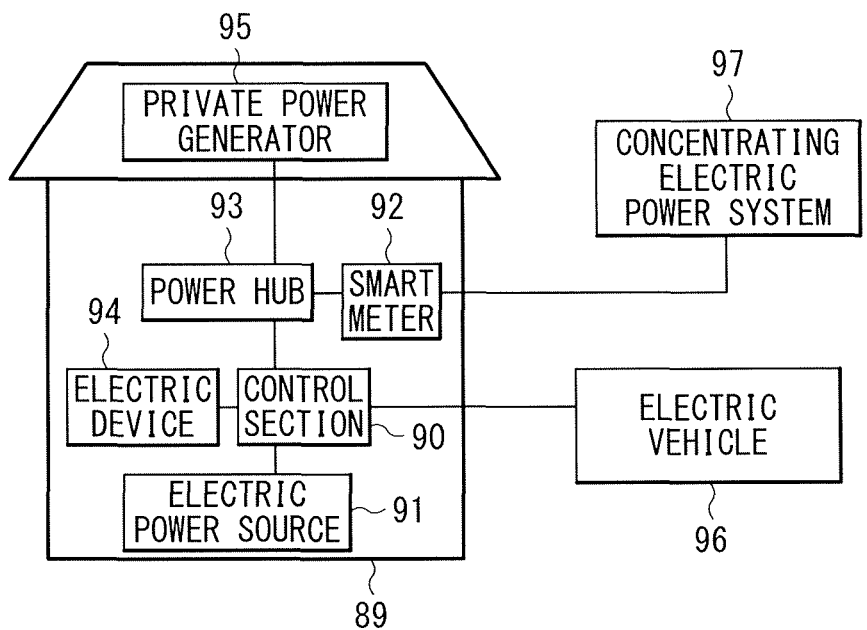
FIG. 5 is a block diagram illustrating a configuration of an application example (an electric power storage system) of the secondary battery.

FIG. 5 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connectable to an electric vehicle 96 parked outside the house 89. Further, for example, the electric power source 91 may be connected to a private power generator 95 arranged in the house 89 through the power hub 93, and may be connectable to an external concentrating electric power system 97 through the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including a used state of the electric power source 91), and, for example, may include a CPU and/or the like. The electric power source 91 includes one or more secondary batteries of an embodiment of the present application. The smart meter 92 may be, for example, an electric power meter compatible with a network arranged in the house 89 demanding electric power, and may be communicable with an electric power supplier. Accordingly, for example, while the smart meter 92 communicates with outside, the smart meter 92 controls the balance between supply and demand in the house 89, and thereby allows effective and stable energy supply.

In the electric power storage system, for example, electric power may be stored in the electric power source 91 from the concentrating electric power system 97 as an external electric power source through the smart meter 92 and the power hub 93, and electric power is stored in the electric power source 91 from the private power generator 95 as an independent electric power source through the power hub 93. The electric power stored in the electric power source 91 is supplied to the electric device 94 and the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be provided for each household (family unit), or may be provided for a plurality of households (family units).

[2-4. Electric Power Tool]

Figure 6:
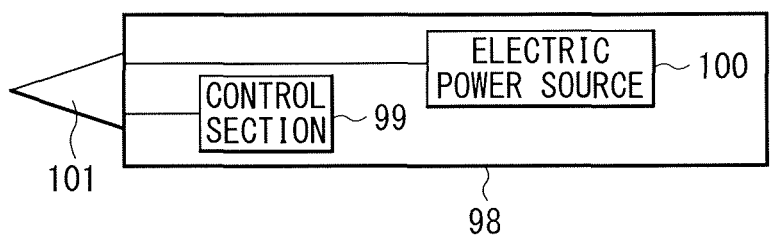
FIG. 6 is a block diagram illustrating a configuration of an application example (an electric power tool) of the secondary battery.

FIG. 6 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a used state of the electric power source 100), and may include, for example, a CPU and/or the like. The electric power source 100 includes one or more secondary batteries of an embodiment of the present application. The control section 99 allows electric power to be supplied from the electric power source 100 to the drill section 101 according to operation of an unillustrated operation switch.

EXAMPLES

Specific examples of the embodiment of the present application are described in detail.

Examples 1 to 12

Figure 7:
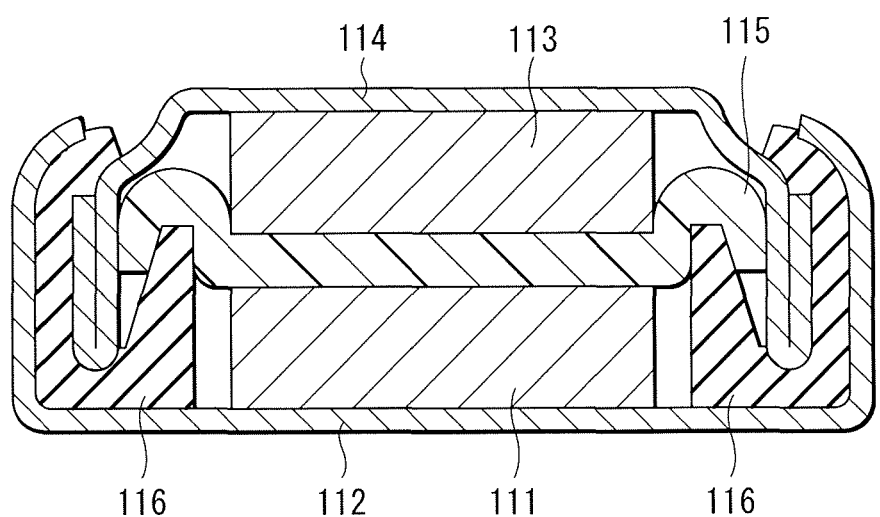
FIG. 7 is a cross-sectional view illustrating a configuration of a test-use secondary battery (a coin type).

As a test-use secondary battery, a coin-type lithium ion secondary battery illustrated in FIG. 7 was fabricated. In the secondary battery, a test electrode 111 and a counter electrode 113 were laminated with a separator 115 in between, and a package can 112 that contains the test electrode 111 and a package cup 114 that contains the counter electrode 113 were swaged with a gasket 116.

When fabricating the test electrode 111, first, 98 parts by mass of a cathode active material (LiCoO$_2$), 1.2 parts by mass of a cathode binder (PVDF), and 0.8 parts by mass of a cathode electric conductor (graphite) were mixed to obtain a cathode mixture. Subsequently, the cathode mixture was dispersed in an organic solvent (N-methyl-2-pyrrolidone) to obtain paste cathode mixture slurry. Subsequently, the cathode mixture slurry was applied onto a single surface of the cathode current collector (a strip-like aluminum foil being 12 μm thick) with the use of a coating device (an applicator), and the applied cathode mixture slurry was dried to form the cathode active material layer. In this case, area density of the cathode active material layer was set to 26.5 mg/cm$^2$. Lastly, the cathode active material layer was compression-molded with the use of a roll pressing machine. In this case, volume density of the cathode active material layer was set to 3.8 g/cm$^3$.

When fabricating the counter electrode 113, first, 92.5 parts by mass of an anode active material (artificial graphite), 4.5 parts by mass of an anode binder (PVDF), and 3 parts by mass of an anode electric conductor (a phase growth carbon fiber) were mixed to obtain an anode mixture. Subsequently, the anode mixture was dispersed in an organic solvent (N-methyl-2-pyrrolidone) to obtain paste anode mixture slurry. Subsequently, the anode mixture slurry was applied onto a single surface of the anode current collector (a strip-like copper foil being 10 μm thick) with the use of a coating device, and the applied anode mixture slurry was dried to form the anode active material layer. In this case, area density of the anode active material layer was set to 13.6 mg/cm$^2$. Lastly, the anode active material layer was compression-molded with the use of a roll pressing machine. In this case, volume density of the anode active material layer was set to 1.6 g/cm$^3$.

When forming the electrolyte layer, electrolyte salt (LiPF$_6$) was dissolved in a solvent to prepare electrolytic solution. As the solvent, in Examples 1 to 9 and 12, ethylene carbonate, propylene carbonate, and dimethyl carbonate were used at a mixture ratio (a weight ratio) of ethylene carbonate:propylene carbonate:dimethyl carbonate=25:25:50. In Examples 10 and 11, ethylene carbonate, diethyl carbonate, and dimethyl carbonate were used at a mixture ratio (a weight ratio) of ethylene carbonate:diethyl carbonate:dimethyl carbonate=25:25:50. A content of the electrolyte salt was set to 1 mol/kg with respect to the solvent.

Subsequently, the electrolytic solution and the polymer compound were mixed at a weight ratio of electrolytic solution:polymer compound=3:1 to prepare mixture solution. A composition of the polymer compound, more specifically, kinds and copolymerization amounts (wt %) of the polymerization units composing the main chain and kinds and copolymerization amounts (wt %) of the polymerization units composing the side chain were as shown in Table 1. In this case, a block copolymer was used for the polymer composing the main chain, and a random homopolymer or a random copolymer was used for the polymer composing the side chain. It is to be noted that a copolymerization amount of 100 wt % related to AA and MA shown in Table 1 indicates that the polymer was a homopolymer.

Subsequently, the mixture solution was processed with the use of a homogenizer to uniformly disperse the polymer compound in the electrolytic solution. Thereafter, the processed mixture solution was stirred while being heated at 75 deg C., thereby obtaining sol precursor solution. In this case, the stirring of the mixture solution was continued until a color of the mixture solution turned into a colorless state. Lastly, a surface of each of the test electrode 111 (the cathode active material layer) and the counter electrode 113 (the anode active material layer) was coated with the precursor solution, following which the test electrode 111 and the counter electrode 113 coated with the precursor solution were dried at 90 deg C. for 2 minutes to form a gel electrolyte layer. In this case, coating speed of the precursor solution was set to 20 m/minute.

When assembling the secondary battery, first, the test electrode 111 on which the electrolyte layer was formed was punched into a pellet-like shape, and then the test electrode 111 having the pellet-like shape was contained in the package can 112. Subsequently, the counter electrode 113 on which the electrolyte layer was formed was punched into a pellet-like shape, and then the counter electrode 113 having the pellet-like shape was contained in the package cup 114. Lastly, the test electrode 111 contained in the package can 112 and the counter electrode 113 contained in the package cup 114 were layered with the separator 115 (a porous polyolefin film being 7 μm thick) in between, and then the package can 112 and the package cup 114 were swaged with the gasket 116. In this case, the electrolyte layer formed on the test electrode 111 and the electrolyte layer formed on the counter electrode 113 were made to face each other with the separator 115 in between.

Gelling characteristics, coating characteristics, ion conduction characteristics, and capacity degradation characteristics were examined as characteristics of each of the electrolyte layers and the secondary batteries, and results shown in Table 1 were obtained.

When examining the gelling characteristics, a gelling state of the precursor solution was evaluated by measuring a time (a stirring time) until the mixture solution became colorless while stirring the mixture solution at viscosity from 40 mPa·s to 80 mPa·s and at temperature of 70 deg C when obtaining the sol precursor solution. In this case, a case where the stirring time was within 40 minutes was evaluated as "excellent", a case where the stirring time was over 40 minutes but was within 70 minutes was evaluated as "good", and a case where the stirring time was over 70 minutes was evaluated as "fair".

When examining the coating characteristics, a coating state of the precursor solution was evaluated when the sol precursor solution was applied. In this case, a case where it was easy to apply the precursor solution to achieve a uniform thickness was evaluated as "good", and a case where it was difficult to apply the precursor solution but a uniform thickness was achieved finally was evaluated as "fair".

When examining the ion conduction characteristics, the sol precursor solution was contained in a silicon circular plate, for resin embedding, having a diameter of 10 mm, which was heated at 50 deg C. for 45 minutes to obtain the gel electrolyte layer. Subsequently, the electrolyte layer was cut into a rectangular shape of 40 mm×40 mm. Thereafter, the electrolyte layer was sandwiched between two leads each made of nickel and having a width of 40 mm, following which the leads and the electrolyte layer was surrounded by a laminated film to fabricate a cell for measuring ion conductivity. Subsequently, a real axis intercept of the electrolyte layer corresponding to a direct-current resistance (DCR) was determined by an alternate-current impedance measuring method (Cole-Cole-Plot method). In this case, EC-Lab available from Bio-Logic Corporation was used as a measuring apparatus, and measuring conditions were set at frequency from 1 Hz to 1 MHz, at an application voltage of 5 mV, and at a measuring temperature of 25 deg C. Lastly, ion conductivity (S/cm)=thickness of the electrolyte layer/ (real axis intercept ×the area of the electrolyte layer) was determined.

When the capacity degradation characteristics were examined, an index (degradation speed) that indicated a tendency of degradation in discharge capacity of the secondary battery upon repetition of charge and discharge was derived based on the following theory. At the time of charge and discharge, a lithium ion and the electrolytic solution reacts with each other on the surface of the anode active material, and a coating film is therefore formed on the surface of that anode active material. Here, taking into consideration a relationship between formation speed of the coating film and a thickness of the coating film, it is assumed that the relationship therebetween is in accordance with "square root law (a law that formation speed is inversely proportional to the thickness)". On the basis of this assumption, the thickness of the coating film is proportional to $(time)^{1/2}$, from which a relationship that a capacity degradation rate is also proportional to $(time)^{1/2}$ is derived. By replacing $(time)^{1/2}$ with charge and discharge (cycle) of the secondary battery, a slope of capacity degradation with respect to (the number of cycles)$^{1/2}$ in a case where the secondary battery was charged and discharged at low temperature of 0 deg C. was considered as degradation speed.

The cycle conditions were as follows. First, in order to stabilize the state of the secondary battery, the secondary battery was charged and discharged under an ambient temperature environment at 23 deg C. In this case, the secondary battery was charged at a constant current of 0.2 C until reaching an upper voltage of 4.3 V, and was further charged at a constant voltage of 4.3 V until a total charge time reached 8 hours. Thereafter, the secondary battery was discharged at a constant current of 0.2 C until reaching a final voltage of 3V. Subsequently, the secondary battery was charged and discharged for 50 cycles under a low temperature environment at 0 deg C. In this case, the secondary battery was charged at a constant current of 0.5 C until reaching the upper voltage of 4.3 V, and was further charged at a constant voltage of 4.3 V until the total charge time reached 3 hours. Thereafter, the secondary battery was discharged at a constant current of 0.5 C until reaching the final voltage of 3V. It is to be noted that "0.2 C" is a value of a current that causes the battery capacity (theoretical capacity) to be completely discharged in 5 hours, and "0.5 C" is a value of a current that causes the battery capacity to be completely discharged in 2 hours.

TABLE 1

| Example | Polymerization unit of main chain (wt %) | | Polymerization unit of side chain (wt %) | | | | | | | Gelling state | Coating state | Ion conductivity (S/cm) | Degradation speed |
|---|---|---|---|---|---|---|---|---|---|---|---|---|---|
| | VDF | HFP | VDF | HFP | MMM | TFE | CTFE | AA | MA | | | | |
| 1 | 93 | 7 | 93 | 7 | — | — | — | — | — | Excellent | Good | 3.8 | −4.7 |
| 2 | 93 | 7 | 91.2 | 7 | 0.5 | 1.3 | — | — | — | Excellent | Good | 3.7 | −4.8 |
| 3 | 93 | 7 | 91 | 7 | 0.5 | — | 1.5 | — | — | Excellent | Good | 3.8 | −4.8 |
| 4 | 93 | 7 | — | — | — | — | — | 100 | — | Good | Good | 3.8 | −4.5 |
| 5 | 93 | 7 | — | — | — | — | — | — | 100 | Good | Good | 3.7 | −4.6 |
| 6 | 80 | 20 | 80 | 20 | — | — | — | — | — | Good | Good | 4 | −4.7 |
| 7 | 80 | 20 | 75.5 | 20 | 0.5 | 4 | — | — | — | Good | Good | 3.9 | −4.5 |
| 8 | 80 | 20 | 78.2 | 20 | 0.5 | — | 1.3 | — | — | Good | Good | 3.9 | −4.6 |
| 9 | 80 | 20 | — | — | — | — | — | 100 | — | Fair | Fair | 3.6 | −4.3 |

TABLE 1-continued

| | Polymerization unit of main chain (wt %) | | Polymerization unit of side chain (wt %) | | | | | | | Gelling | Coating | Ion conductivity | Degradation |
|---|---|---|---|---|---|---|---|---|---|---|---|---|---|
| Example | VDF | HFP | VDF | HFP | MMM | TFE | CTFE | AA | MA | state | state | (S/cm) | speed |
| 10 | 97 | 3 | 93 | 7 | — | — | — | — | — | Fair | Fair | 3 | −3.5 |
| 11 | 97 | 3 | — | — | — | — | — | 100 | — | Fair | Fair | 2.9 | −3.1 |
| 12 | 93 | 7 | — | — | — | — | — | — | — | Excellent | Good | 2.8 | −3 |

The gelling state, the coating state, the ion conductivity, and the degradation speed varied largely depending on the composition of the polymer compound as described below.

In a case where the main chain was composed of a block copolymer that included VDF and HFP as the polymerization units, when a specific kind of side chain was introduced into the main chain (Examples 1 to 11), a favorable gelling state and a favorable coating state were maintained while the ion conductivity increased and the degradation speed was decreased, compared to a case where such a side chain was not introduced (Example 12).

In particular, in the cases where the side chain was introduced into the main chain (Examples 1 to 11), the following tendencies were also achieved.

Firstly, when the copolymerization amount of VDF was larger than the copolymerization amount of HFP in the main chain (the block copolymer), a favorable gelling state and a favorable coating state were achieved. Consequently, the sol precursor solution was allowed to be stably applied and the gel electrolyte layer was allowed to be stably formed.

Secondly, when the above-described copolymerization amount of HFP was from 7 wt % to 20 wt %, the gelling state and the coating state were further improved.

Thirdly, when the polymerization units composing the side chain were selected from VDF, HFP, MMM, TFE, and CTFE (Examples 1 to 3), a favorable gelling state and favorable ion conductivity were maintained while degradation speed was decreased, compared to cases where the polymerization unit was selected from AA and MA (Examples 4 and 5). More specifically, in the case where the polymerization unit composing the side chain was AA or the like, when the copolymerization amount of HFP composing the main chain was small (when the copolymerization amount thereof was smaller than 7 wt %), a long time was necessary for gelling, which led to excessive volatilization of the solvent in the electrolytic solution. Accordingly, viscosity of the precursor solution was increased, and it was therefore difficult to apply the precursor solution. On the other hand, in the case where the polymerization unit composing the side chain was VDF and/or the like, the gelling was completed in a short time and it was therefore easy to apply the precursor solution, even when the copolymerization amount of HFP composing the main chain was small.

As can be seen from the results shown in Table 1, when the polymer compound in the electrolyte layer included the block-graft copolymer, favorable gelling characteristics and favorable coating characteristics were achieved and the ion conduction characteristics and the capacity degradation characteristics were improved. Consequently, superior battery characteristics were obtained in the secondary battery provided with the electrolyte layer.

The present application has been described above referring to an embodiment and Examples. However, the present application is not limited to the examples described in the embodiment and Examples, and may be variously modified. For example, the description has been given with the specific examples of the case in which the battery structure is of a laminated film type or a coin type and the battery device has a spirally wound structure. However, applicable structures are not limited thereto. The secondary battery of the present application is similarly applicable to a case where the secondary battery has other battery structure such as a cylindrical type or a square type, and to a case where the battery device has other structure such as a laminated structure.

Moreover, in the above embodiment and Examples, description has been given of the lithium ion secondary battery in which the capacity of the anode is obtained by insertion and extraction of lithium. However, this is not limitative. For example, the secondary battery according to the embodiment of the present application may be a lithium metal secondary battery in which the capacity of the anode is obtained by precipitation and dissolution of lithium. Alternatively, the secondary battery according to the embodiment of the present application may be a secondary battery in which the capacity of the anode is obtained as the sum of the capacity obtained by insertion and extraction of lithium and the capacity obtained by precipitation and dissolution of lithium by allowing the capacity of the anode material capable of inserting and extracting lithium to be smaller than the capacity of the cathode.

Moreover, the description has been given of the case in which lithium is used as the electrode reactant in the above embodiment and Examples. However, the electrode reactant is not limited thereto. The electrode reactant may be, for example, other Group 1 element such as sodium (Na) and potassium (K) in the long form of the periodic table, a Group 2 element such as magnesium and calcium in the long form of the periodic table, or other light metal such as aluminum. Alternatively, the electrode reactant may be an alloy including one or more of the above-described series of elements.

The effects described in the present specification are mere examples. The effects of the present application are not limited thereto, and may include other effects.

It is possible to achieve at least the following configurations from the above-described example embodiments and the modifications of the disclosure.

(1)

A secondary battery including:
  a cathode;
  an anode; and
  an electrolyte layer including non-aqueous electrolytic solution and a polymer compound,
  the polymer compound including a graft copolymer,
  the graft copolymer including a block copolymer as a main chain, and including one or both of a homopolymer and a copolymer as one or more side chains,
  the block copolymer including, as polymerization units, vinylidene fluoride and hexafluoropropylene, the homopolymer including, as a polymerization unit, one selected from the group consisting of vinylidene fluoride, hexafluoropropylene, monomethyl maleate, trifluoroethylene, chlorotrifluoroethylene, acrylic acid, and methacrylic acid, and the copolymer including, as polymerization units, two or more selected from the group consisting of vinylidene fluoride, hexafluoropropylene, monomethyl maleate, trifluoroethylene, chlorotrifluoroethylene, acrylic acid, and methacrylic acid.

(2)
The secondary battery according to (1), wherein the block copolymer has a copolymerization amount of vinylidene fluoride that is larger than a copolymerization amount of hexafluoropropylene therein.

(3)
The secondary battery according to (1) or (2), wherein
the homopolymer includes, as the polymerization unit, one selected from the group consisting of vinylidene fluoride, hexafluoropropylene, monomethyl maleate, trifluoroethylene, and chlorotrifluoroethylene, and
the copolymer includes, as the polymerization units, two or more selected from the group consisting of vinylidene fluoride, hexafluoropropylene, monomethyl maleate, trifluoroethylene, and chlorotrifluoroethylene.

(4)
The secondary battery according to any one of (1) to (3), wherein the block copolymer has a copolymerization amount of hexafluoropropylene from about 7 weight percent to about 20 weight percent both inclusive.

(5)
The secondary battery according to any one of (1) to (4), wherein the secondary battery is a lithium ion secondary battery.

(6)
A battery pack including:
the secondary battery according to any one of (1) to (5);
a control section configured to control operation of the secondary battery; and
a switch section configured to switch the operation of the secondary battery according to an instruction of the control section.

(7)
An electric vehicle including:
the secondary battery according to any one of (1) to (5);
a conversion section configured to convert electric power supplied from the secondary battery into drive power;
a drive section configured to operate according to the drive power; and
a control section configured to control operation of the secondary battery.

(8)
An electric power storage system including:
the secondary battery according to any one of (1) to (5);
one or more electric devices configured to be supplied with electric power from the secondary battery; and
a control section configured to control the supplying of the electric power from the secondary battery to the one or more electric devices.

(9)
An electric power tool including:
the secondary battery according to any one of (1) to (5); and
a movable section configured to be supplied with electric power from the secondary battery.

(10)
An electronic apparatus including
the secondary battery according to any one of (1) to (5) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
a cathode;
an anode; and
an electrolyte layer including non-aqueous electrolytic solution and a polymer compound,
the polymer compound including a graft copolymer,
the graft copolymer including a block copolymer as a main chain, and including a copolymer as a side chain,
the block copolymer including, as polymerization units, vinylidene fluoride and hexafluoropropylene, and
the copolymer including at least vinylidene fluoride and hexafluoropropylene as polymerization units.

2. The secondary battery according to claim 1, wherein the block copolymer has a first copolymerization amount of vinylidene fluoride that is larger than a first copolymerization amount of hexafluoropropylene therein.

3. The secondary battery according to claim 1, wherein the copolymer as the side chain has a second copolymerization amount of vinylidene fluoride larger than a second copolymerization amount of hexafluoropropylene.

4. The secondary battery according to claim 1, wherein the block copolymer has a copolymerization amount of hexafluoropropylene from about 7 weight percent to about 20 weight percent both inclusive.

5. The secondary battery according to claim 1, wherein the secondary battery is a lithium ion secondary battery.

6. A battery pack comprising:
a secondary battery;
a control section configured to control operation of the secondary battery; and
a switch section configured to switch the operation of the secondary battery according to an instruction of the control section,
the secondary battery including
a cathode,
an anode, and
an electrolyte layer including non-aqueous electrolytic solution and a polymer compound,
the polymer compound including a graft copolymer,
the graft copolymer including a block copolymer as a main chain, and including a copolymer as a side chain,
the block copolymer including, as polymerization units, vinylidene fluoride and hexafluoropropylene, and
the copolymer including at least vinylidene fluoride and hexafluoropropylene as polymerization units.

7. An electric vehicle comprising:
a secondary battery;
a conversion section configured to convert electric power supplied from the secondary battery into drive power;
a drive section configured to operate according to the drive power; and
a control section configured to control operation of the secondary battery, the secondary battery including
a cathode,
an anode, and
an electrolyte layer including non-aqueous electrolytic solution and a polymer compound,
the polymer compound including a graft copolymer,
the graft copolymer including a block copolymer as a main chain, and including a copolymer as a side chain,
the block copolymer including, as polymerization units, vinylidene fluoride and hexafluoropropylene, and
the copolymer including at least vinylidene fluoride and hexafluoropropylene as polymerization units.

8. An electric power storage system comprising:
a secondary battery;
one or more electric devices configured to be supplied with electric power from the secondary battery; and
a control section configured to control the supplying of the electric power from the secondary battery to the one or more electric devices,
the secondary battery including
a cathode,
an anode, and
an electrolyte layer including non-aqueous electrolytic solution and a polymer compound,
the polymer compound including a graft copolymer,
the graft copolymer including a block copolymer as a main chain, and including a copolymer as a side chain,
the block copolymer including, as polymerization units, vinylidene fluoride and hexafluoropropylene, and
the copolymer including at least vinylidene fluoride and hexafluoropropylene as polymerization units.

9. An electric power tool comprising:
a secondary battery; and
a movable section configured to be supplied with electric power from the secondary battery,
the secondary battery including
a cathode,
an anode, and
an electrolyte layer including non-aqueous electrolytic solution and a polymer compound,
the polymer compound including a graft copolymer,
the graft copolymer including a block copolymer as a main chain, and including a copolymer as a side chain,
the block copolymer including, as polymerization units, vinylidene fluoride and hexafluoropropylene, and
the copolymer including at least vinylidene fluoride and hexafluoropropylene as polymerization units.

10. An electronic apparatus comprising
a secondary battery as an electric power supply source,
the secondary battery including
a cathode,
an anode, and
an electrolyte layer including non-aqueous electrolytic solution and a polymer compound,
the polymer compound including a graft copolymer,
the graft copolymer including a block copolymer as a main chain, and including a copolymer as a side chain,
the block copolymer including, as polymerization units, vinylidene fluoride and hexafluoropropylene, and
the copolymer including at least vinylidene fluoride and hexafluoropropylene as polymerization units.

11. The secondary battery according to claim 1, wherein the block copolymer of the main chain is coupled with the copolymer of the side chain at a coupling point, and wherein a polymerization unit in the main chain at the coupling point is different from a polymerization unit in the side chain at the coupling point.

* * * * *